Nov. 13, 1962     R. DUFOUR     3,063,468
REMOTELY CONTROLLED VALVE SYSTEM
Filed July 17, 1959     2 Sheets-Sheet 1
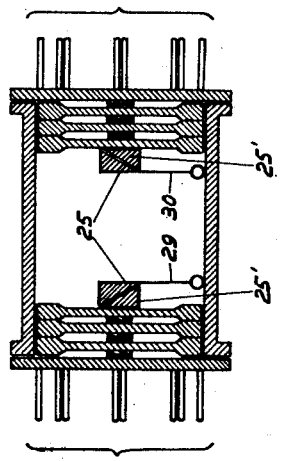
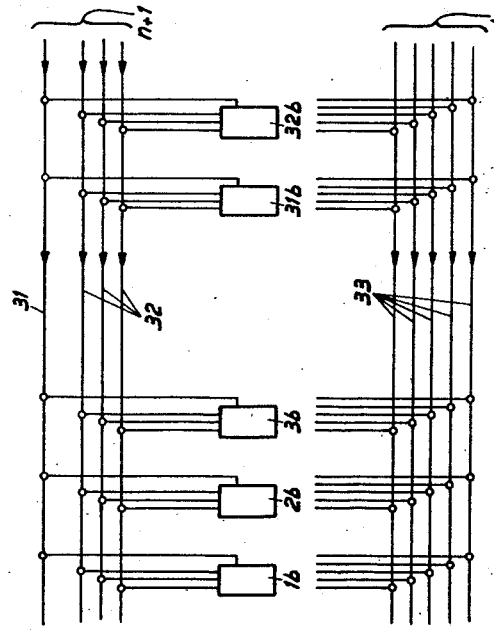
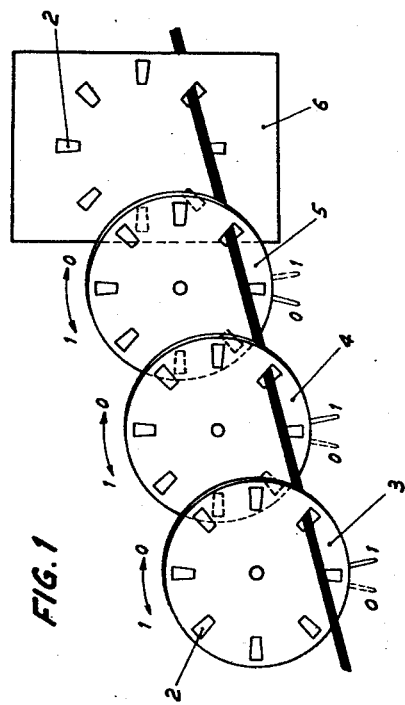
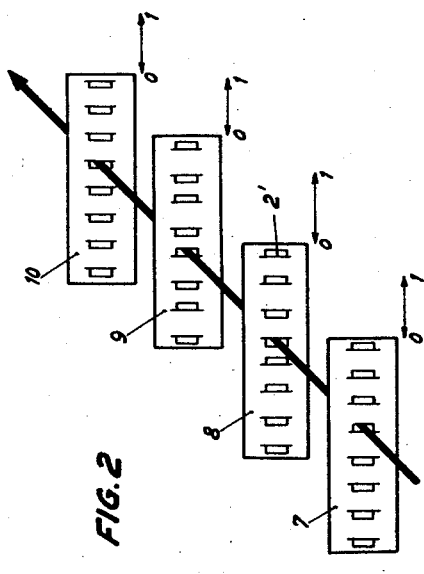
INVENTOR.
ROLAND DUFOUR
BY Kent Kelman
AGENT Nov. 13, 1962     R. DUFOUR     3,063,468
REMOTELY CONTROLLED VALVE SYSTEM
Filed July 17, 1959     2 Sheets-Sheet 2
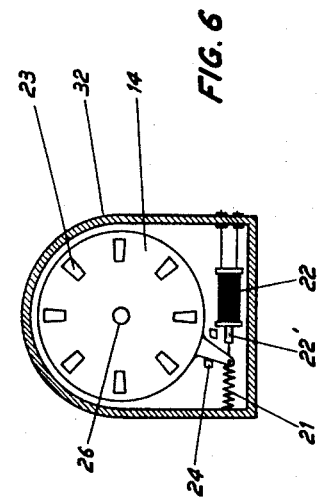
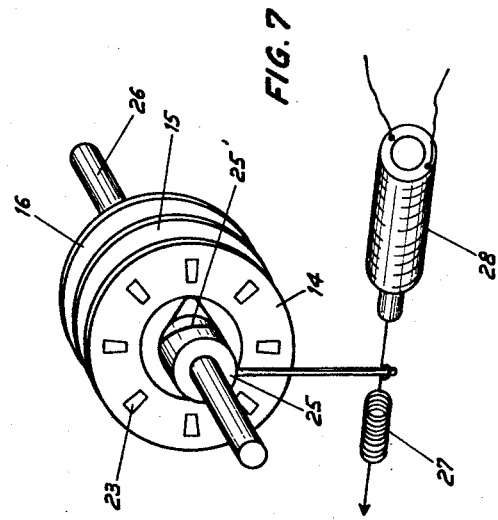
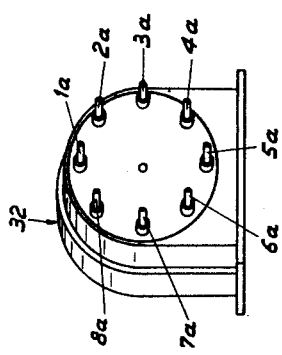
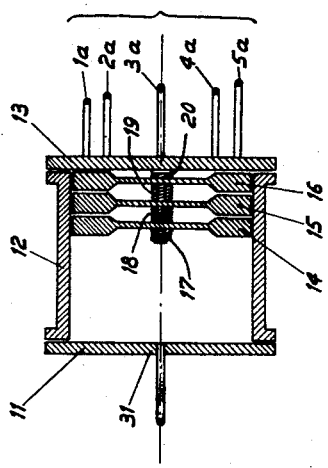
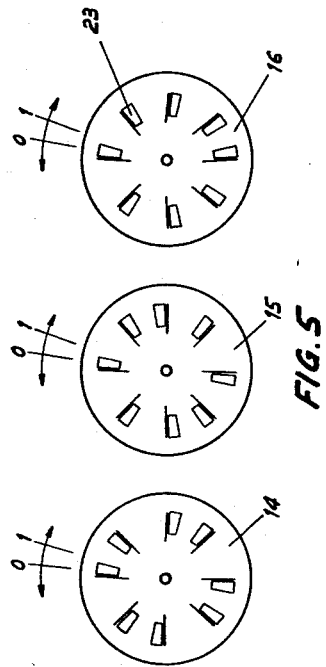
INVENTOR.
ROLAND DUFOUR

United States Patent Office 3,063,468
Patented Nov. 13, 1962

3,063,468
REMOTELY CONTROLLED VALVE SYSTEM
Roland Dufour, Paris, France, assignor to Societe
d'Etudes et Conseils A.E.R.O., Paris, France
Filed July 17, 1959, Ser. No. 827,738
Claims priority, application France July 19, 1958
2 Claims. (Cl. 137—552.5)

The present invention relates to valve systems and in particular to remotely controlled valves of the type used in the oil, gas chemical, nuclear, and air conditioning industries for remote control of complex fluid circuits.

According to an important feature of the invention, principles of Boolean algebra are employed for the solution of problems inherent in a complex valve system. Accordingly, the opening or the closing of a valve is assigned a code which may be a numerical one. A binary code is preferred wherein alternate positions of the movable valve parts are represented by "0" and "1."

According to another feature of the invention, a valve system is provided in which communications are established between valve inlets and outlets by alignment of apertures in a fixed member and in one or several mobile members.

An object of the present invention is to distribute, according to a predetermined program, one or more fluids in a system of pipes or conduits by means of a minimum number of valves actuated by a minimum number of orders or signals.

A feature of the present invention resides in improved valve systems suitable for control by digital data processing systems.

According to one of its features, the invention provides a plurality of mechanical elements adapted to occupy a plurality of discrete relative positions correlated with successive values of a code such as a binary, a ternary, a biquinary code or a non numerical code for controlling the magnitude and/or direction of a fluid flow, an electric current and the like.

According to another feature of the invention there is provided a control valve in which the rate of flow of a controlled fluid is related to the displacement of a movable member by any predetermined relationship (e.g. an exponential or a parabolic relationship).

The valve systems of the invention may be operated by signals transmitted in any one of the binary codes (pure binary codes, reflected binary codes or binary-decimal codes, etc.).

It is a basic feature of a binary code system that $2^n$ different numbers or values may be represented by $n$ symbols.

In this system numbers are represented by the sums of powers of 2 indicated by the figures represented by the digits "0" or "1."

A feature of the present invention is to apply this system to the control of electrically actuated valves in order to reduce the number of orders or signals necessary for a predetermined number of switching operations.

For instance, 16 different flow channels or 16 different values of fluid output are capable to be selected with only 4 actuating orders.

The advantages of the present invention are important, for example, in a refinery installation or a nuclear plant where remote control of valves is a major operation.

In a binary coded multi-way valve according to the invention, it is possible to obtain with only "$n$" moving parts, $2^n$ ways of flow.

According to another feature of the present invention locking means are provided for all the moving parts of the valve so as to keep said parts locked and to hold them in position except during the short time of operation.

Amongst the advantages of a valve system of the invention are the following:

No energy is drawn from a power supply after moving valve parts have been brought into a desired position.

A tight seal is established between the movable parts.

Very little energy is necessary to displace the movable valve parts when unlocked.

In the event of power failure, all moving parts are automatically brought into a predetermined safe position.

The valves are capable of being sealed and flame-proofed.

A large number of valves may be controlled by a single set of wires transmitting signals consisting of an address and an instruction, the address being an assigned serial number of the valve to be controlled, and the instruction designating the channel to be brought into action.

Almost instantaneous action is achieved in moving the valve parts, and actuation time is constant whatever the number of flow channel changes.

Very little pressure-drop occurs in the binary coded multiple way valve of the invention which provides straight-through fluid flow.

In a specific embodiment of the invention, a valve may include three coaxially movable discs and a fixed member.

Each disc has two angular positions corresponding to code signals "0" and "1," and each disc and the fixed member have suitably calibrated and circumferentially distributed apertures.

For each combination of the positions of the discs, there is a different path, but only one straight path through axially aligned apertures.

The invention will be more fully described with reference to specific embodiments shown in the annexed drawings in which:

FIG. 1 shows essential working elements of a valve of the invention in an exploded perspective view;

FIG. 2 is a view of working elements of another embodiment shown in the manner of FIG. 1;

FIG. 3 is a perspective view of the valve of the invention;

FIG. 4 is a fragmentary view of the valve of FIG. 3 taken in section on the axis of the rotary working elements, and omitting the actuating and locking mechanism;

FIG. 5 shows rotatable elements of the apparatus of FIG. 2 juxtaposed in a radial plane to illustrate the configuration of their radial faces;

FIG. 6 is an elevational sectional view of the apparatus of FIG. 1 with the locking mechanism removed to reveal the mechanism actuating rotation of the elements shown in FIG. 5;

FIG. 7 shows the rotatable elements of FIG. 5 assembled on the common shaft with the locking mechanism of the apparatus of FIG. 1 in a perspective view;

FIG. 8 illustrates another embodiment of the invention in a view corresponding to FIG. 4, but including elements of the locking mechanism; and FIG. 9 is a conventional wiring diagram of a control system including a plurality of valves of the type shown in FIGS. 3 to 7, the actual source of current and the common return conductor of all circuits having been omitted for the sake of clarity.

The valve of the invention consists essentially of an assembly of superimposed apertured movable and fixed elements. The movable elements are provided in a number equal to "$n$" if $2^n$ modes of valve operation are required. The valve elements are enclosed in a housing provided with input and output channels. Each mobile element is capable of taking two positions according to the two values "1" or "0" of a binary signal code.

The apertures of the mobile elements are arranged in such a way that for all possible combinations or positions coordinated with the code signals "1" and "0" there is formed a single continuous passage through apertures of all the mobile elements and fixed elements, the apertures of the latter providing input and output channels.

The movable elements may be plates, discs, sectors of discs, portions of cylinders and the like. Their displacement may be rectilinear or rotary.

FIGURE 1 shows working elements of a device of the invention in which three coaxially rotatable circular discs 3, 4, 5 cooperate with a fixed member 6. Each disc and the member 6 are formed with eight apertures 2 arranged on circles of equal radius about the common axis of the discs. Each disc is angularly movable about its axis between positions 0 and 1. The circumferential spacing of the apertures 2 is not entirely uniform. In each combination of disc positions, only a single aperture of each disc and of the fixed member are aligned.

By moving one or more of the discs between position 1 and position 0, it is possible to open eight different axial channels through the device.

FIGURE 2 represents an analogous arrangement of working elements in which four apertured plates 7, 8, 9 and 10 are capable of being moved linearly between a position 0 and a position 1 to selectively provide eight different flow channels through respective ones of eight apertures 2′.

An actual embodiment of the invention is illustrated in FIGS. 3 to 7.

The discs 14, 15 and 16 are rotatable and axially movable on a common shaft 26 and axially separated by springs 17, 18, 19 and 20. They are mounted within a fluid tight housing or valve body 32. A radially extending end plate 13 of the housing 32 carries eight outlet nipples 1a to 8a communicating with corresponding apertures of the plate 13 which are uniformly spaced about the axis of the shaft 26 for selective alignment with apertures of the rotatable discs. A single inlet opening 31 in the other end plate 11 communicates with the valve space in the housing 32 which also includes an axial wall 12. Rotary movement of the discs 14, 15, 16 is actuated by means of individual electro-magnets and springs as shown in FIG. 6 with reference to disc 14.

The disc 14 is urged toward position 0 by a spring 21 attached to the housing 32, and moved into position 1 by an electro-magnet 22. The disc 14 is provided with a radial extension 24 the free end of which is attached to the armature 22′ of the magnet 22 and to the return spring 21.

When certain electro-magnets 22 are energized, the rotation of the corresponding discs through a predetermined angle opens a selected one of the 8 channels available through aligned disc apertures 23 in the valve.

The time of switching from one to the other of these 8 channels is constant whatever be the initial position of the discs. The rotatable discs are locked in a selected position by a wedge 25 rotatably mounted on the common shaft 26 and cooperating with a wedge 25′ axially slidable on the shaft 26, but secured against rotation.

An electro-magnet 28 rotates the wedge 25 in one direction in the same manner as the magnet 22 rotates the disc 14. A return spring 27 tends to rotate the wedge 25 in the opposite direction relative to the wedge 25′ which thereby abuttingly urges the disc 14 to move into sealing abutment against the adjacent disc 15, and eventually presses the discs 14, 15, 16 against the end plate 11 carrying the 8 outlet nipples 1a to 8a, and locks the discs.

The locking arrangement ensures tightness of the joints between the discs and immobilization of the discs in the position in which they are in case of interruption of the current energizing the electro magnets.

To operate the valve, it is therefore necessary to energize the electro-magnet 28 which unlocks the wedge 25, and then to energize suitable electromagnets 22 controlling the discs.

After these operations, it is possible to deenergize all electro-magnets. This is an important safety feature of the valves of the invention.

In case of danger, it is possible by energizing the unlocking electro-magnet 28 to return all discs 14, 15, 16 into position 0 which will therefore be chosen as a safety position. This return is actuated solely by the return springs 21.

"Sticking" of the discs to each other is prevented by the separating springs 17 to 20 which thus facilitate relative displacement of the discs.

The locking wedge 25 again locks the discs after positioning. Friction between discs is at a minimum during valve operation and at a maximum after locking.

The device described permits only to connect one inlet to several outlets. Selective connections between multiple inlets and outlets are provided by two systems such as those described above when coupled back to back in a single valve body (FIG. 8). The saving of room is considerable with respect to all other known systems of valves.

All the essential features of the apparatus shown in FIGS. 3 to 7 described above are retained but there are two wedges 25 and two wedges 25′ actuated by respective rods 29 and 30. Eight inputs are provided on one end wall and eight outlets on the other.

The valves described above require power only during operation and then automatically retain their position. It is therefore possible to use the same conductors for actuating numerous valves located at different spots in the same installation, if care is taken to direct actuating signals towards the intended valves.

Such an installation requires two circuits for transmitting signals to all the multi-channel valves to be controlled.

In the example of a circuit arrangement illustrated in FIG. 9, there are 32 valves 1b to 32b, each being a multi-channel valve selectively providing eight passages. In 31 is shown the locking wire. 32 represents the switching wires, and finally 33 represents the wires of the selector circuit for transmitting a five-digit binary code signal for switching on individual valves.

The first circuit for transmitting the code number or "address" of the multi-channel valves to be controlled has "$n'$" connecting wires 33 if one wishes to control $2^{n'}$ valves. (In the present case 5 wires 33 for 32 valves.)

The second circuit of wires 32 provides control of the channel to be switched (or of the output to be regulated). It is necessary to have $n$ wires 32 if use is made of valves with $2^n$ channels (3 in the present case).

One supplementary locking wire 31 is necessary for the entire installation. To sum up, for the whole installation, one needs $5+3+1=9$ wires.

Other arrangements are obviously possible and the above example is only given by way of illustration and not of limitation.

What I claim is:

1. A valve comprising a housing including inlet means and outlet means; a plurality of valve members in said housing, each formed with a plurality of apertures; a source of electric control signals; means responsive to said signals for moving said members into and out of a plurality of relative positions in which selected ones of the apertures of said valve members are aligned to form respective continuous passages between said inlet means and said outlet means; locking means movable into a locking position for jointly locking said members in said predetermined positions; resilient means permanently urging said locking means to move into said locking position, a source of an electric unlocking signal; and actuating means responsive to said unlocking signal for unlocking said members against the urging of said resilient means for movement of said members by said moving means.

2. A valve comprising a housing including inlet means and outlet means; a plurality of valve members in said housing, each having two opposite faces and being formed with a plurality of apertures having respective orifices in said faces; a source of electric control signals; first actuating means responsive to said signals for moving said members into and out of a plurality of relative positions in which selected ones of the orifices of said apertures are aligned in such a manner that the corresponding apertures of said valve members form continuous passages between said inlet means and said outlet means; resilient means permanently urging adjacent ones of said members into abutting contact of respective faces thereof in the aligned positions of said orifices; a source of an electric unlocking signal; and second actuating means responsive to said unlocking signal for spacing said respective faces from each other during movement of said members by said first actuating means against the urging of said resilient means.

References Cited in the file of this patent

UNITED STATES PATENTS

| | | |
|---|---|---|
| 1,354,522 | Takala | Oct. 5, 1920 |
| 1,384,233 | Califf | July 12, 1921 |
| 1,408,932 | Coutts | Mar. 7, 1922 |
| 2,904,070 | Lynott | Sept. 15, 1959 |